United States Patent [19]

Chang

[11] Patent Number: 4,966,937

[45] Date of Patent: Oct. 30, 1990

[54] LOW SMOKE COATING COMPOSITIONS USING PHOSPHONITRILIC ELASTOMERIC BLENDS

[75] Inventor: Suae-Chen Chang, Baton Rouge, La.

[73] Assignee: Ethyl Corporation, Richmond, Va.

[21] Appl. No.: 356,184

[22] Filed: May 24, 1989

[51] Int. Cl.$^5$ .................. C08L 79/08; C08L 85/02
[52] U.S. Cl. ................................ 524/538; 524/610; 524/500; 525/435; 525/538
[58] Field of Search ............... 524/500, 538, 539, 610; 525/435, 538

[56] References Cited

U.S. PATENT DOCUMENTS

| | | | |
|---|---|---|---|
| 3,890,092 | 6/1975 | Garner | 524/415 |
| 4,064,095 | 12/1977 | Oberster et al. | 524/122 |

FOREIGN PATENT DOCUMENTS 0009642  4/1980  European Pat. Off. ............ 524/538

Primary Examiner—Lewis T. Jacobs
Assistant Examiner—Edward J. Webman
Attorney, Agent, or Firm—Richard J. Hammond

[57] ABSTRACT

A process for forming a low smoke, low flame spread composition comprising mixing polybenzimidazole fiber; an inorganic powder filler; and a non-fluorinated phosphazene polymer of the formula

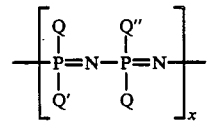

where x is an integer from about 20 to about 50,000, Q and Q' are the same or different and are $C_1$ to $C_6$ linear or branched alkoxy or substituted or unsubstituted aryloxy and Q" is a group having olefinic unsaturation; and a fluorinate phosphazene polymer of the formula

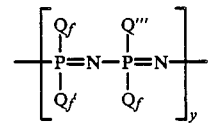

where y is an integer from about 20 to about 50,000 $Q_f$ and $Q'_f$ are the same or different and are $-OCH_2(CF_2)_nCF_3$ or $-OCH_2(CF_2)_nCF_2H$ where n is the integer 1 to 20 and Q''' is a group having olefinic unsaturation.

12 Claims, No Drawings

LOW SMOKE COATING COMPOSITIONS USING PHOSPHONITRILIC ELASTOMERIC BLENDS

This invention relates to the use of phosphonitrilic elastomeric coatings to provide low smoke compositions for substrates exposed to flammable conditions. More particularly, this invention relates to a blend of fluorine-containing and non-fluorine containing phosphonitrilic elastomers admixed with benzimidazole fibers to provide low smoke coating compositions useful on substrates that may be exposed to flammable conditions.

Fires in buildings or on board ships or in other similar structures presents a serious threat to men and material. This threat arises because of both the heat generated by the fire and the smoke which accompanies the destruction of material exposed to the fire and its heat. In enclosed areas, burning panels, bulkheads and the like can be a major hazard. When ignited, these conventionally-coated substrates give off large volumes of particulate-containing gases. Coatings containing polyvinylchloride or other halogenated material in flammable conditions generate highly toxic and corrosive smoke. In any case, it is generally accepted that the greatest damage to life and equipment under flowable conditions is not from the actual fire but from the smoke and gas generated as a result of the fire.

In flammable environments polyphosphazenes offer a number of advantages over conventional coating materials. Polyphosphazenes which contain a high mole concentration of aromatic substituent groups are inherently non-burning, even when they do not contain halogen. They can be vulcanized (cross-linked) with peroxides or sulfur, dependent on the type and concentration of cure site present While cross-linking minimizes dripping during combustion, these polymers typically revert to low molecular weight species during high temperature exposure, making them undesirable as coating compositions for buildings, etc which may experience such temperatures For many applications, elastomeric coatings which possess an inherently good resistance to fire, are desired. Poly(phosphazenes) such as those described in the following U.S. patents exhibit such a fire resistance: U.S. Pat. Nos. 3,853,794 issued Dec. 10, 1974; 3,856,712 issued Dec. 24, 1974; 3,856,713 issued Dec. 24, 1974, 3,883,451 issued May 13, 1975, and 4,064,095 issued Dec. 20, 1977.

Other poly(phosphazenes) to which the present invention is applicable are described in the literature, in other issued patents and in pending patent applications.

Further properties desired in the compounded poly(phosphazenes) are low smoke generation, and compatibility with fillers and other additives the use of which permit the poly(phosphazenes) to be compounded, and cured or vulcanized in much the same fashion that compositions based on natural rubber or synthetic rubbers are processed.

A principal object of this invention is to provide formulations based on phosphazene elastomers exhibiting very low smoke output and high flame resistance. It has been found that when these phosphazenes are blended with certain organic polymer fibers in accordance with the present invention, the flame propagation and smoke density are surprisingly improved. This invention resides in the use of a blend of fluorine-containing phosphazene with non-fluorine-containing phosphazene combined with an organic polymer fiber and an inorganic powder filler to result in a low smoke composition having very little flame propagation tendency. Unlike many of the prior art compositions, no plasticizer is required to produce such compatible mixture nor are large quantities of inorganic compounds that, when heated, decompose releasing either $CO_2$ or $H_2O$ and concurrently absorbing large amounts of heat.

Briefly, the invention contemplates a process utilizing the radiation, peroxide or sulfur accelerated cures of phosphazene polymer-containing compositions in which most of the chlorine atoms in linear $(NPCl_2)_n$ polymers have been replaced with substituents such as those described in the prior art, e.g., alkoxy, and/or aryloxy groups which may be substituted in the manner taught in the United States patents; see for example, U.S. Pat. Nos. 3,370,020; 3,853,794; 3,856,713 and 3,970,533 the disclosures of which are intended to be incorporated herein by reference. The replacement of the remaining chlorine atoms in linear $(NPCl_2)_n$ polymers with substituents which possess at least some unsaturation which serve as a cure site is also described in these patents.

The following structural formula may be taken as one way of illustrating the polyphosphazenes useful in practicing the formation of blends of the present invention, although it is to be understood that the distribution of the Q, Q' and Q'' groups may be regular or irregular and that the phosphazene polymer may be either linear or branched:

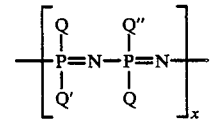

in which Q, Q' and Q'' represent monovalent groups randomly distributed along the —P=N— backbone and x is an integer of from about 20 to about 50,000. In phosphazenes containing no fluorine atoms the Q and Q' groups are preferably $C_1$ to $C_6$ linear or branched alkoxy or substituted or unsubstituted aryloxy groups which are relatively inert or unreactive to the various curing accelerators as compared to the Q'' groups which contain some unsaturation. The total of Q and Q' groups are sufficient to replace at least 90% and preferably at least 95% but not more than 99.9% of the Cl atoms originally present in the linear $(NPCl_2)_n$ polymer. The Q'' groups are groups with some unsaturation, e.g., a group represented by —O—R—R¹ in which R is $C_1$ to $C_6$ linear or branched alkylene or substituted or unsubstituted arylene and R¹ is a group which includes some olefinic unsaturation, e.g., alkenyl groups such as vinyl, allyl, crotyl, or the like. The number of Q'' groups are distributed randomly in the phosphazene, preferably being between 0.1 and 5% of the total of Q plus Q' plus Q''. The Q and Q' groups may be either the same or they may differ and each may represent more than one saturated group. Because of the greater reactivity exhibited by the Q'' groups, as compared with the Q and Q' groups, the Q'' groups serve as cure sites for cross linking and vulcanization. As noted, fluorine is absent from both Q, Q' and Q''.

Particularly preferred non-fluorine containing phosphonitrilic elastomers for use in this invention are those where Q and Q' are the same or different and are methoxy, ethoxy, amyloxy, phenoxy, m or p-cresyloxy, p-ethylphenoxy, and the like and Q" is o-allylphenoxy.

The fluorine-containing phosphazene elastomers have the structural formula shown below where $Q_f$ and $Q_f'$ may be the same or different and are typically $-OCH_2(CF_2)_nCFZ$ where Z is hydrogen or fluorine, n is an integer of 1 to 20 and y is an integer from about 20 to about 50,000. As in the case of the non-fluorinated polymers, these fluorinated ones may contain Q''' for further curing.

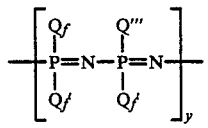

The Q''' group can be the same or different than Q" and are groups with some unsaturation, e.g. represented by $-O-R^2-R^3$ where $R^2$ is $C_1$ to $C_6$ linear or branched alkylene or substituted unsubstituted arylene and $R^3$ is a group having some unsaturation, e.g., alkenyl such as vinyl, crotyl, allyl and the like.

Particularly preferred fluorine-containing phosphonitrilic elastomers for use in the process of this invention are those where $Q_f$ and $Q_f'$ are the same or different and are 2,2,2-trifluoroethoxy, 2,2-difluoroethoxy, 2,2,3,3,3-pentafluoropropoxy and the like and Q''' is o-allylphenoxy.

Illustrative of the method useful to prepare the phosphonitrilic elastomers used in the compositions of the present invention is the following reaction sequence for the preparation of non-fluorine-containing materials with phenol and derivatives of phenol illustrative of the aryloxides preparation. Fluorine-containing ones are prepared in a like manner.

Preparation of Sodium Aryloxides

The amounts of reactants (based on 200 g of $(NPCl_2)_n$ chloropolymer) are calculated as follows, 200 g of chloropolymer being considered equivalent to 200/116, i.e., 1.72 moles $(NPCl_2)_n$:

| Theory for aryloxides | 2 moles/mol of $(NPCl_2)_n=$ 3.44 moles (2 × 1.72) |
|---|---|
| Actual amount of aryloxides provided | 3.82 mole (11% excess) |
| Amount of sodium provided | 3.83 mole (88 g) |
| The following amounts of phenols were provided: | |
| phenol | 194 g (60%) |
| p-ethylphenol | 207.4 g (50%) |
| o-allylphenol | 56 g (12%) |

The phenols and sodium are weighed separately into bottles in which they are mixed with anhydrous tetrahydrofuran (THF) and capped. These operations are carried out in a drybox. About 1200 ml of THF was added to the phenols and about 150 ml of THF was added to the sodium.

The Na/THF is added to three-necked flask equipped with a stirrer, dropping funnel and an argon or nitrogen purge line. Under the purged atmosphere, the phenols in THF were added dropwise with stirring for about 2 hours at room temperature, the reaction being exothermic. After addition of the phenols, the reaction mixture was stirred at room temperature overnight. Generally, after 8 hours stirring the sodium has all reacted. A yellow to brown solution of the phenolates is obtained.

Derivation of $(NPCl_2)_n$

The 200 g of linear $(NPCl_2)_n$ in benzene (total volume is about 2400 ml) is added rapidly (20 to 30 minutes) to the aryloxides prepared above in 1200 ml of THF and 2500 ml of benzene in the reactor. The reaction mixture is then stirred at about 300° F. for 24 hours. Upon cooling, the polymer is coagulated by pouring into a 10 gallon can containing 2 gallons of methanol with agitation. The solvents are then drawn off. Additional methanol may be added if the polymer does not separate cleanly from the solution. The solid, as free as possible of solvent, is then desalted by washing with water. The resulting chlorine-free polymer is dried at 50° C. to 60° C. under vacuum.

Essentially the compositions of this invention comprise the following:
Polyphosphazene(s);
Fillers;
Fibers;
Processing Aid(s);
Curing Agent(s);
and any other additives added for special properties.

The elastomeric phosphorous-containing polymer blends are compounded as illustrated below with certain polymeric, organic fibers. These fibers obtained from polymers of benzimidazoles are useful in the process of this invention in about 1 to about 60% by weight based on phosphonitrilic elastomer blend. Preferably the amount of polymeric organic fiber is from about 25 to about 50% by weight, most preferably 40–50% by weight based on phosphonitrilic elastomer blend. Amounts of fiber greater or lesser than the range noted above impair the physical properties of the low smoke coating compositions.

The polybenzimidazole fibers of the present invention are commercially available from Celanese Fibers Marketing Corporation, P.O. Box 32414, Charlotte, N.C. 28232, under the trademark CELANESE PBI. The term "polybenzimidazole polymer" (or "PBI") as used herein means a polymer having recurring units of the formula:

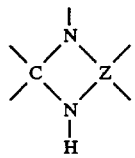

wherein Z is an aromatic nucleus and the nitrogen atoms forming the benzimidazole ring are attached to adjacent carbon atoms of the aromatic nucleus.

In addition to the above, tetramino aromatic compounds containing a pair of ortho disposed amino groups can be reacted with either a diphenylester or an anhydride of an aromatic dicarboxylic acid to form a polybenzimidazole of the head-head, tail-tail variety. These polymers may be represented as consisting essentially of recurring units of the formula:

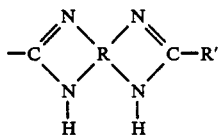

wherein R is a symmetrically tetrasubstituted aromatic nucleus and the nitrogen atoms forming each benzimidazole ring are attached to adjacent carbon atoms of the aromatic nucleus, R' being a member of the class consisting of (I) a carboxcyclic aromatic ring and (II) a heterocyclic ring from the class consisting of (A) pyridine, (B) pyrazine, (C) furan and (D) quinoline. Illustrative polybenzimidazole polymers include poly-2,5,6-benzimidazole, poly-2,2'-(m-phenylene)-5,5'-bibenzimidazole, poly-2,6-(m-phenylene)-diimidazobenzene, poly-2,2'-(pyridylene-3",5")-bibenzimidazole, poly-2,2'-(furylene-2",5")-5-5'bibenzimidazole, poly-2,2'-(p-phenylene)-5,5'-bibenzimidazole, poly-2,6-(p-phenylene)-diimidazobenzene, poly-2,2-biphenylene-4")-5,5'-bibenzimidazole, poly-2,2'-diphenylene-2",2"')-5,5-bibenzimidazole, and poly-2,2-napthalene-1",6")-5,5'-bibenzimidazole. These and other polybenzimidazole polymers suitable for use in the present invention are disclosed in U.S. Pat. No. Re. 26,065 to Marvel et al, issued July 19, 1966. That patent is hereby incorporated herein by reference.

Another component required of the low smoke compositions herein is an inorganic powder filler. These fillers, more particularly described below, are useful at about 1 to about 25% by weight based on the phosphonitrilic elastomer. Preferably, such filler is used at about 5 to 20% by weight, most preferably at about 10 to about 20% by weight based on the phosphonitrilic polymer blend.

The term "inorganic powder filler" as used herein means a combustion resistant powdered material with a particle size range, expressed as specific surface area, of from about 1 meter²/gram to about 200 meter²/gram. Suitable powder fillers include silica, iron oxide, titanium oxide, milled glass, carbon, ceramic clay, and mixtures thereof. Silica powder is preferred because of its low cost and because of its relatively low absorption of the liquid components of the insulating material, which minimizes drying of the composition during mixing. The preferred particle size is at least 20 millimicrons. One material useful herein is a silica HI-SIL 233, sold by PPG Industries, Inc., Pittsburgh, Pa.

A processing aid is required in the compositions of this invention to facilitate the compounding of the poly(phosphazenes) with the combination of fillers, fibers and the curing agent. The preferred processing aid is a silica filled methylvinylphenylpolysiloxane which is a commercial product sold as Silastic HA-2. other aryldimethylpolysiloxanes with either vinyl or phenyl or other aryl substituents have also been found suitable. The amount of processing aid should be between 1 and 100 parts per 100 part of polymer (1–100% by weight) and is preferably present in the amount of 3–11 parts by weight per 100 parts of poly(phosphazenes) with about 10 parts by weight being particularly preferred. As shown in the data which follows, the preferred content of Silastic HA-2 gives a considerable improvement in processing, virtually eliminating mill stick and nerve and has no adverse effect on other properties (smoke, physical properties, etc.). With no Silastic HA-2 (or a similar processing aid) the stocks are very nervy and have considerable mill stick and are very difficult to process on the mill.

Curing is conventionally achieved by means of sulfur or sulfides such as thiuram, monosulfide or peroxides, dicumyl peroxide being preferred. The amount of curing agent is generally up to about 12 part per 100 parts of phosphazene polymer and is readily determinable for any specific composition.

In addition to the filler(s), fibers, processing aid(s) and curing agent(s), other additives which may be present in the polyphosphazene compositions of this invention include antioxidants, stabilizers, and phosphazene oils.

The phosphonitrilic elastomeric composition described herein can be prepared by the following procedure:

1. 50 parts of EYPEL ®-A and 50 parts of EYPEL ®-F are added to a pre-warmed (135° F.) Banbury mixer set at slow speed with cold water on full.
2. After three minutes of slow continuous mixing 40 parts of Hi-Sil 233 is added in increments followed by 100 parts of Silastic HA-2 and 2.0 parts of stearic acid.
3. Slow mixing is continued for twelve more minutes, keeping the mix temperature at approximately 225° F.
4. Mixing is stopped after fifteen minutes and the mixture discharged into a container.
5. The mixture is then transferred to a large mill (at room temp) and 50 parts of PBI fibers and 1 part of Vulcup 40KE are added to the mill. The resulting mix is refined to approximately 0.010 inch thickness by passing through a very tight roll mill five times.

During the mixing process the polymer fibers are broken down from their original length to an average length of approximately 3 mm. This value is an average fiber length; actual fiber length after mixing ranges from 0.02 mm to 4.00 mm. Excessive mixing will lead to further fiber shortening.

EYPEL ®-A is a registered trademark of the Ethyl Corporation for the polyphosphazene where Q and Q' are phenoxy, p-ethylphenoxy and Q" is o-allylphenoxy.

EYPEL ®-F is a registered trademark of the Ethyl Corporation for the polyphosphazene where $Q_f$ and $Q_f'$ are fluoroalkoxy groups and $Q_f''$ is o-allylphenoxy.

The following examples are illustrative only and are not intended to limit the scope of the invention in any way. All quantities are expressed as parts by weight unless otherwise stated.

TABLE

| Composition | Comparative Examples | | | | | Examples | |
|---|---|---|---|---|---|---|---|
|  | 1 | 2 | 3 | 4 | 5 | 1 | 2 |
| EYPEL ® -A gum | 100 | 100 | — | — | — | 50 | 25 |
| EYPEL ® -F gum | — | — | 100 | 100 | 100 | 50 | 75 |
| Hi-Sil 233 | 40 | 40 | — | — | — | — | — |
| QUSO WR55 | — | — | 30 | 30 | 30 | 30 | 30 |
| Silastic HA-2 | 10 | 10 | 5 | 5 | 5 | 5 | 5 |
| PBI fiber | — | 50 | 50 | — | 50 | 50 | 50 |
| Elastomag | — | — | — | — | 2 | — | — |

TABLE-continued

| Composition | Comparative Examples 1 | 2 | 3 | 4 | 5 | Examples 1 | 2 |
|---|---|---|---|---|---|---|---|
| Zinc bis (8-oxy quinolate) | — | — | — | — | 4 | — | — |
| Skan-Tone D5005 Green | — | — | — | — | 2 | — | — |
| Vulcup 40KE | 1.0 | 1.0 | 1.0 | 1.0 | 0.8 | 1.0 | 1.0 |
| Curing Conditions | 340° F./ 30 min | 340° F./ 30 min | 340° F./ 30 min | 340° F./ 30 min | 340° F./ 30 min | 340° F./ 30 min | 340° F./ 30 min |
| Relative Flexibility[a] (cured slabs) | 2 | 4 | 3 | 1 | 4 | 4 | 4 |
| O$_2$/Methane Torch Test | | | | | | | |
| Time required to self extinguish after burning for 15 sec in the flame | 5 sec | 5 sec | 1 sec | 1 sec | 1 sec | 2 sec | 1.5 sec |
| Flame propagation[b] | 6 | 5 | 2 | 1 | 2 | 4 | 3 |
| Char Swell | yes | no | no | no | no | no | no |
| Relative smoke density[c] | 6 | 5 | 1 | 2 | 1 | 4 | 3 |
| Material lost after burn[d] | 2 | 1 | 5 | 6 | 5 | 3 | 4 |

[a] 1 - most flexible, 4 - least flexible
[b] 1 - least flame propagation, 6 - most flame propagation
[c] 1 - lowest smoke density, 6 - highest smoke density
[d] 1 - smallest amount of materials lost, 6 - largest amount of materials lost The above compositions were molded into 75 mil thick 6"×6" slabs and press-cured for 30 minutes at 340° F. The cured slabs were then cut into ½" wide strips. The torch test was done by burning cured strips of samples with an oxygen/methane torch for 15 seconds and observing the time required for the flame on the samples to be self-extinguished. The extent of flame propogation throughout the sample, the resulting char swell, the smoke generated during burn and the amount of materials lost after burn were also recorded.

It was generally considered that if a specimen could withstand this test it was composed of a satisfactory insulating material.

What is claimed is:

1. A process for producing a low smoke coating comprising
   (1) blending together a composition comprising
      (a) an organic polymer fiber that is polybenzimidazole;
      (b) an inorganic powder filler;
      (c) a non-fluorinated linear phosphonitrilic polymer of the formula

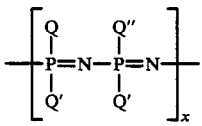

where x is an integer from about 20 to about 50,000, Q and Q' are the same or different and are C$_1$ to C$_{12}$ linear or branched alkoxy, or substituted or unsubstituted aryloxy, and Q" is a group having some olefinic unsaturation; and
a fluorinated linear phosphonitrilic polymer of the formula

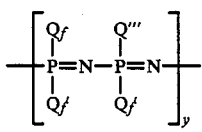

where y is an integer from about 20 to about 50,000, Q$_f$ and Q$_f'$ are the same or different and are fluoroalkoxy of the formula CF$_2$Z(CF$_2$)$_n$CH$_2$O— where n is an integer of from 1 to 20 and Z is hydrogen or fluorine and Q''', is a group having some olefinic unsaturation;
      (d) an effective amount of a curing agent and, processing aid; and
   (2) curing the blend.

2. The process of claim 1 wherein Q" is —O—R—R' where R is C$_1$ to C$_6$ linear or branched alkylene or substituted or unsubstituted arylene and R' is C$_1$ to C$_6$ linear or branched alkenyl.

3. The process of claim 2 wherein Q and Q' are the same or different and are methoxy, ethoxy, phenoxy, m-cresyloxy, p-cresyloxy and p-ethylphenoxy and R' is vinyl, allyl, crotyl or o-allylphenoxy.

4. The process of claim 3 wherein Q and Q' are the same and are p-ethylphenoxy and Q" is o-allylphenoxy.

5. The process of claim 1 wherein Q''' is —O—R$^2$—R$^3$ where R$^2$ is C$_1$ to C$_6$ linear or branched alkylene or substituted or unsubstituted arylene and R$^3$ is C$_1$ to C$_6$ linear or branched alkenyl.

6. The process of claim 2 wherein Q$_f$ and Q$_f'$ are the same or different and are 2,2,2-trifluoroethoxy, 2,2-difluoroethoxy and 2,2,3,3,3-pentafluoropropoxy and R$^3$ is vinyl, allyl, crotyl or o-allylphenoxy.

7. The process of claim 3 wherein Q$_f$ and Q$_f'$ are the same and are 2,2,2-trifluoroethoxy and Q''' is o-allylphenoxy.

8. The process of claim 1 wherein said composition comprises
   (a) from about 25 to about 50% by weight of said organic polymer fiber;
   (b) from about 5 to about 20% by weight of said inorganic powder filler; and
   (c) said non-fluorinated phosphonitrilic polymer wherein Q" is —O—R—R' where R is C$_1$ to C$_6$ linear or branched alkylene or substituted or unsubstituted arylene and R' is C$_1$ to C$_6$ linear or branched alkenyl.

9. The process of claim 1 wherein said composition comprises
   (a) from about 25 to about 50% by weight of said organic polymer fiber;
   (b) from about 5 to about 20% by weight of said inorganic powder filler; and (c) said, fluorinated phosphonitrilic polymer Q''' is —O—R²—R³ where R² is $C_1$ to $C_6$ linear or branched alkylene or substituted or unsubstituted arylene and R³ is $C_1$ to $C_6$ linear or branched alkenyl.

10. The process of claim 8 wherein said composition
(a) from about 25 to about 50% by weight of said organic polymer fiber;
(b) from about 5 to 20% by weight of said inorganic powder filler; and
(c) said non-fluorinated phosphonitrilic polymer wherein Q and Q' are are the same or different and are methoxy, ethoxy, phenoxy, m-cresyloxy, p-cresyloxy and p-ethylphenoxy and Q'' is —O—R—R' where R' is vinyl, allyl, crotyl or o-allylphenoxy.

11. The process of claim 10 wherein Q and Q' are the same and are p-ethylphenoxy and Q''' is o-allylphenoxy.

12. A process for producing a low smoke coating
(1) blending together a composition comprising
(a) 40–50% by weight of a polybenzimidazole fiber;
(b) 10–20% by weight of an inorganic powder filler;
(c) a non-fluorinated linear phosphonitrilic polymer of the formula

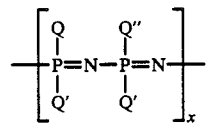

where x is an integer from about 20 to about 50,000, Q and Q' are the same or different and are methoxy, ethoxy, phenoxy, m-cresyloxy, p-cresyloxy and p-ethylphenoxy and Q'' is —O—R—R' where R' is vinyl, allyl, crotyl, or o-allylphenyl; and
a fluorinated linear phosphonitrilic polymer of the formula

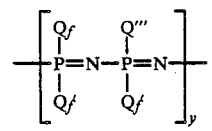

where y is an integer from about 20 to about 50,000, $Q_f$ and $Q'_f$ are the same or different and are —$OCH_2(CF_2)_nCF_2Z$ where n is an integer from 1 to 20 and Z is hydrogen or fluorine and Q''' is —O—R²—R³ where R³ is vinyl, allyl, crotyl or o-allylphenyl;
(d) 1 to 100% by weight of a processing aid based on said non-fluorinated and said fluorinated phosphonitrilic polymer;
(e) sufficient amount of a curing agent for curing the composition; and
(2) curing the blend.

* * * * *

UNITED STATES PATENT AND TRADEMARK OFFICE
CERTIFICATE OF CORRECTION

PATENT NO. : 4,966,937

DATED : October 30, 1990

INVENTOR(S) : Suae-Chen Chang

It is certified that error appears in the above-identified patent and that said Letters Patent is hereby corrected as shown below:

Column 8, line 27, reads "Q''"; should read --Q'''--.

Column 9, line 8, reads "said composition", should read --said composition comprises--.

Signed and Sealed this

Twenty-eighth Day of July, 1992

Attest:

DOUGLAS B. COMER

*Attesting Officer*     *Acting Commissioner of Patents and Trademarks*